United States Patent [19]

Wu et al.

[11] 4,386,196

[45] May 31, 1983

[54] INTERFACIAL PROCESS FOR PRODUCING POLY(ESTER-CARBONATE) CONTAINING PHENOLPHTHALEIN

[75] Inventors: Tse C. Wu, Morristown; Leon Segal, Randolph, both of N.J.

[73] Assignee: Allied Corporation, Morris Township, Morris County, N.J.

[21] Appl. No.: 364,589

[22] Filed: Apr. 2, 1982

[51] Int. Cl.$^3$ ............................................. C08G 63/64
[52] U.S. Cl. ........................... 528/182; 528/179; 528/180; 528/181; 528/190
[58] Field of Search ........ 528/190, 193, 194, 179-182, 528/354-359

[56] References Cited

U.S. PATENT DOCUMENTS

| | | | |
|---|---|---|---|
| 3,523,078 | 8/1970 | Korshak et al. | 252/12 |
| 4,156,069 | 5/1979 | Prevorsek et al. | 528/182 |
| 4,238,596 | 12/1980 | Quinn | 528/179 |
| 4,238,597 | 12/1980 | Markezich et al. | 528/190 |
| 4,252,939 | 2/1981 | Mori et al. | 528/171 |
| 4,255,556 | 3/1981 | Segal et al. | 528/190 |
| 4,260,731 | 4/1981 | Mori et al. | 528/173 |
| 4,278,787 | 7/1981 | Swart et al. | 528/191 |
| 4,310,652 | 1/1982 | DeBona et al. | 528/190 |
| 4,311,822 | 1/1982 | Dege et al. | 528/190 |

FOREIGN PATENT DOCUMENTS 1179400  1/1970  United Kingdom.

*Primary Examiner*—Lester L. Lee
*Attorney, Agent, or Firm*—Alan M. Doernberg; Gerhard H. Fuchs; Roy H. Massengill

[57] ABSTRACT

An interfacial process for producing a poly(ester-carbonate) containing aromatic dihydroxy moieties derived from phenolphthalein. In the process, phenolphthalein polyester oligomers are formed first, and then the oligomers are reacted with phosgene and with additional aromatic or cycloaliphatic diacyl halide and with an aqueous solution of bisphenol-derived salt to form the poly(ester-carbonate).

13 Claims, No Drawings

INTERFACIAL PROCESS FOR PRODUCING POLY(ESTER-CARBONATE) CONTAINING PHENOLPHTHALEIN

BACKGROUND OF THE INVENTION

The present invention relates to processes for the production of a poly(ester-carbonate), and especially to such processes wherein phenolphthalein is one of the aromatic dihydroxy compounds used, and in which the aromatic dihydroxy compounds are introduced as alkaline metal or alkali earth metals salt (that is, interfacial processes).

A poly(ester-carbonate) having carbonate moieties, terephthalate moieties and moieties derived from bisphenol-A are described in U.S. Pat. No. 4,156,069 to Prevorsek et al (1979). The process employed in that reference was a solution process, introducing the bisphenol in its neutral form, and employing a catalyst-acid acceptor to neutralize by-product hydrogen halide. A modification of that poly(ester-carbonate), having as the aromatic dihydroxy moiety a moiety derived from phenolphthalein, either instead of or in addition to the bisphenol-A moiety, is described in U.S. Pat. No. 4,310,652 to DeBona et al (1982). The primary synthetic procedure disclosed in U.S. Pat. No. 4,310,652 is also a solution process, but there is some general description that the polymer disclosed can be produced by interfacial processes or by hybrid solution-interfacial processes. See especially Col. 4, lines 54–59; Col. 5, lines 1–6; and Col. 6, lines 24–31 and 38–43.

An interfacial process for the production of the poly(ester-carbonate) of U.S. Pat. No. 4,156,069, and other materials, are described in U.S. Pat. No. 4,255,556 to Segal et al (1981). In that process, at least a portion of the phosgene is reacted with the bisphenolate (e.g. aqueous disodium bisphenol-A) before or during reaction of acid chloride (e.g. terephthaloyl chloride) with bisphenolate. As described more fully below, the application of the process of U.S. Pat. No. 4,255,556 to the production of the phenolphthalein-containing polymer of U.S. Pat. No. 4,310,652 has met with only limited success. It is accordingly an object of the present invention to produce a phenolphthalein-containing poly(ester-carbonate) by interfacial techniques with desired polymer characteristics, and especially with reasonably high solution viscosities and reasonably low color.

Other interfacial processes for producing various poly(ester-carbonate) polymers are disclosed in U.S. Pat. Nos. 4,252,939 to Mori et al. (1981); 4,260,731 to Mori et al. (1981); 4,278,787 to Swart et al. (1981); 4,238,597 to Markezich et al. (1980); and 4,238,596 to Quinn (1980). In addition, polycarbonates containing phenolphthalein, and polyesters including phenolphthalein are known, as indicated in the literature cited in the second paragraph of U.S. Pat. No. 4,310,652, and especially British Pat. No. 1,179,400 (Jan. 28, 1970) and U.S. Pat. No. 3,523,078 (Aug. 4, 1970) of V. V. Korshak et al.

BRIEF DESCRIPTION OF THE INVENTION

The present invention includes a process for the production of a poly(ester-carbonate) containing aromatic or cycloaliphatic dicarboxylate moieties, carbonate moieties, 2,2-bis(p-oxyphenyl)phthalide moieties derived from phenolphthalein and bisphenol-derived moieties of the formula

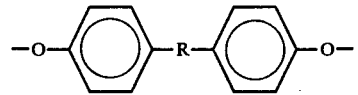

wherein R is a divalent organic moiety of 1–6 carbons, —S—, or a single bond, which comprises:

(a) reacting an aqueous solution consisting essentially of water, base and an alkali metal or an alkaline earth metal salt of phenolphthalein with an organic solution consisting essentially of a substantially water-soluble solvent and an aromatic or cycloaliphatic diacyl halide, in the presence of a phase transfer catalyst, to form a phenolphthalein-aromatic or cycloaliphatic dicarboxylate polyester oligomer; and (b) polymerizing said polyester oligomer by reaction with phosgene and additional aromatic or cycloaliphatic diacyl halide and by reaction with an aqueous solution of the alkaline metal or alkali earth metal salt of the bisphenol-derived moiety to form a poly(ester-carbonate).

DETAILED DESCRIPTION OF THE INVENTION

The process of the present invention is used to produce by interfacial techniques polymers such as those described in U.S. Pat. No. 4,310,652. The two acidic reactants employed are phosgene and an aromatic or cycloaliphatic dicarboxyl halide (also called an aromatic or cycloaliphatic diacyl halide). Preferred aromatic diacyl halides include terephthaloyl chloride, isophthaloyl chloride, terephthaloyl bromide, isophthaloyl bromide, and substituted forms of any of them, as indicated in conjuction with formula 1 in U.S. Pat. No. 4,310,652. Other suitable aromatic diacyl halides include those derived from biphenyl dicarboxylic acid, various compounds containing two-benzene carboxylic acid halide moieties linked by an R‴, as indicated in formula III of U.S. Pat. No. 4,310,652 and various naphthalene diacyl halides, including substituted forms thereof, as indicated by formula IV of U.S. Pat. No. 4,310,652. Suitable cycloaliphatic diacyl halides include substituted and unsubstituted cyclohexane dicarboxylic acid. Any of these diacyl halides may be mono-substituted or multi-substituted with substituents such as Cl, Br, alkyl of 1–6 carbons, phenyl, alkoxy or 1–6 carbons or phenoxy.

The third moiety is that indicated by the above formula having an R divalent moiety between two paraphenoxy moieties. While R in such a formula can be any organic moiety of 1–6 carbons, (such as alkylene of 1–6 carbons, 1,3-phenylene, 1,4-phenylene or any form thereof) it may also be sulfide, or a single bond. The bisphenol-derived moieties are used in the present process as alkali metal or alkaline earth metal salts, such as the disodium, dipotassium, calcium and magnesium salts, with the disodium and dipotassium salts being preferred, and the disodium salts being especially preferred.

Similar alkali metal or alkaline earth metal salts of phenolphthalein, preferably of high purity, are also used in the process of the present invention. It will be appreciated that these salts are highly colored because of the known tautomerism of the phenolphthalein salts between the simple bisphenolate form and the quinonoid form. While aqueous bisphenolate salts of phenolphthalein have, it is believed, been used in the production of polymers previously, it is believed particularly surprising that polymers of low color can be formed by introducing the phenolphthalein moiety in this form. See above-cited portions of U.S. Pat. No. 4,310,652. In both the first (reacting) step and the second (polymerizing) step of the present invention, a catalyst (called a phase transfer catalyst) is employed. While various secondary and, especially, tertiary amines known to be useful as phase transfer catalysts in the preparation of polyesters and polycarbonates may be used (e.g. trialkylamines, such as triethylamine), it is preferred in the present invention to use quaternary ammonium salts such as tetrabutylammonium hydrogen sulfate, and other tetraalkylammonium salts, and especially such salts having anions such as hydrogen sulfate, chloride and bromide which have a proper balance of hydrophobic and hydrophilic properties which are important as a phase transfer catalyst.

Other components may also be present during the process; and, especially, chain regulators such as t-butylphenol and surfactants may be used. It has been found, however, that with the present reaction, surfactants are preferably not present, and little or no chain regulators may be required either for the initial reacting step or for the polymerizing step.

In the process of the present invention, the alkali metal or alkaline earth metal salt of phenolphthalein is reacted first with an organic solution consisting essentially of a solvent and an aromatic or cycloaliphatic diacyl halide. Thus, for example, aqueous disodium phenolphthalein salt is reacted with a solution of terephthaloyl chloride in a halogenated hydrocarbon solvent such as dichloromethane. The catalyst, e.g. tetrabutylammonium hydrogen sulfate, is generally added separately as a solution in either an aqueous or an organic solvent, or is added with any of the dihydroxyl compounds or diacyl halide. This interfacial reaction is conducted with sufficient agitation, and sufficient temperature and for sufficient time to form a phenolphthalein ester oligomer. In order to prevent the phenolphthalein ester from having a relatively large number average monomer unit size, it is desirable that the mole ratio of phenolphthalein to diacyl halide not be close to 1:1, and preferably be between about 0.9:1 and about 0.5:1. It is also contemplated, however, to conduct this initial reaction with an excess of phenolphthalein salt compared to terephthaloyl halide, such that the ratio of phenolphalein to diacyl halide is between about 1:0.9 and about 1:0.5. The choice of which reactant to provide an excess will, in general, determine the predominant end-group of the oligomer.

As indicated in the description below, and especially in Examples 4 and 5, it is not necessary that either the phosgene or the aqueous bisphenolate be excluded entirely from the reacting step. Thus, it is contemplated to have between about 1 and about 20 percent, by moles of aromatic or cycloaliphatic diacyl halide, of phosgene present in the reacting step, with the phosgene in the first step being more commonly limited to between about 1 and about 10 percent, by moles of diacyl halide. Similarly, the salt of the bisphenol-derived moiety (e.g. disodium bisphenol-A) may also be present in the reacting step in relatively minor amounts, such as between about 1 and about 20 percent, by moles of phenolphthalein salt, and more commonly between about 1 and about 10 percent, by moles of phenolphthalein salt. It is also contemplated that minor amounts of both phosgene and salt of the bisphenol-derived moiety may be present, although their total mole percent presence, on the above bases, is preferably no more than about 20 percent, and more preferably no more than about 10 percent.

Once the oligomer is formed, it is then polymerized in one or more steps by reaction with phosgene and additional aromatic or cycloaliphatic diacyl halide (if any) and by reaction with an aqueous solution of the alkali metal or alkaline earth metal salt of the bisphenol-derived moiety. This polymerizing step may be conducted in a single step, by adding both additional diacyl halide and phosgene (either or both in a suitable organic solvent such as dichloromethane) and by adding, under agitation, an aqueous solution of the bisphenol-derived salt.

It is contemplated, however, to separate the two parts of the polymerizing step, and it is especially preferred to react the phenolphthalein aromatic or cycloaliphatic dicarboxylate polyester oligomer first with residual aromatic or cycloaliphatic diacyl halide and phosgene (either or both in organic solvent) and then to react the intermediate product with the aqueous solution of the salt of the bisphenol-derived moiety. If the polymerizing steps are conducted in this order, it is preferred that phenolphthalein be present in excess in the oligomer-forming step, so that oligomers will be predominantly hydroxyl terminated rather than acyl halide terminated. If the diacyl halide is present in excess in the oligomer-forming step, then it is preferred to react the oligomer first with aqueous solution of the salt of the bisphenol-derived moiety, and then with the residual aromatic or cycloaliphatic diacyl halide and phosgene (optionally in solution).

Temperature is not a critical parameter in either the oligomer-forming reaction step or in the polymerizing step. Nevertheless, it is preferred to conduct both steps substantially at room temperature (e.g. 5°-35° C.). The time required for each step can be determined by routine experimentation, with the completion of any of the steps usually being determinable by changes in pH. In general, however, times between about 45 minutes and about 2 hours are normally sufficient for both the oligomer-forming step and the polymerization step (or for the two parts of the polymerization step). It is preferred, but not required, that both oligomer-forming steps and polymerization steps be conducted in closed vessels, under a blanket of inert atmosphere, and with other common safeguards employed in the production of polyesters, polycarbonates and poly(ester-carbonates) polymers.

EXAMPLES

In all of the following examples, reduced specific viscosities were measured in a 60/40 phenol/tetrachloroethane solution at 25° C., Tg was measured by DSC at 20° C./min and Yellowness Indices were measured by a Hunterdon Color/Difference Meter 190 2502 in accordances with ASTM-D1925.

EXAMPLE 1

3.2 g (0.08 mol) of NaOH dissolved in 200 mL of water was placed in a 3 L flask fitted with two dropping funnels, a condenser, a gas-inlet tube, and a stirrer. Phenolphthalein (PTL) (12.7 g, 0.04 mol) was added to the solution in a nitrogen atmosphere, forming a deep red solution. A solution containing 0.68 g (0.002 mol) of tetrabutylammonium hydrogen sulfate (TBAHS) in 500 mL of dichloromethane (DCM) was added. The emulsion was stirred vigorously while 400 mL of a DCM solution containing 16.2 g (0.08 mol) of terephthaloyl chloride (TPC) was added. The deep red mixture became almost colorless and quite clear after the TPC addition.

A solution containing 36.5 g (0.16 mol) of bisphenol-A (BPA), 12.8 g (0.32 mol) of NaOH, and 350 mL of water was placed in a second dropping funnel. Half of the solution was added to the reaction mixture which became pink. After 10 minutes 8 g (0.08 mol) of phosgene (PSG) was introduced at the rate of 0.5 g/min. Five minutes later the white, milky emulsion was treated with the remaining half of the BPA solution when the mixture became faintly pink. Another 100 mL of TPC solution containing 4.1 g (0.02 mol) of TPC in DCM was added. The cream-like mixture was then treated with two more grams of phosgene to complete the reaction.

The polymer solution was separated, washed five times with water, precipitated in 8 L of isopropanol, filtered, and dried. The white, fluffy, fibrous polymer was found to have a reduced specific viscosity of 0.77 dL/g.

EXAMPLE 2

Example 1 was repeated under similar conditions in order to supply material for further evaluation. There was obtained a 71% yield of polymer which was soluble in DCM. The polymer was reprecipitated from the DCM solution, filtered, and dried. It was found to have a Tg of 206° C. A disc of ⅛ inch (3.2 mm) ×117/16 inch (36.5 mm) diameter molded at 310° C. was found to have a Yellowness Index of 25.3, transmission of 76.3% and haze of 10.0%. The reduced specific viscosity of the polymer was 0.49 dL/g.

EXAMPLE 3

An aqueous solution containing 12.7 g (0.04 mol) of PTL, 3.2 g (0.08 mol) of NaOH, 0.68 (0.002 mol) of TBAHS, and 180 mL of water was stirred vigorously with 500 mL of DCM under a nitrogen atmosphere. A solution containing 20.3 g (0.1 mol) of TPC dissolved in 500 mL of DCM and placed in a dropping funnel, from which 350 mL (0.07 mol) was added to the reaction mixture. Phosgene was introduced at 0.5 g/min. for 2 minutes. The reaction mixture at this point separated easily into two phases on standing. Both layers were colorless and the organic phase was slightly hazy.

Stirring was resumed while 160 mL of an aqueous solution containing 18.25 g (0.08 mol) of BPA was added. The resulting milky red mixture was stirred for 15 minutes. The remaining 150 mL of TPC solution was added. After stirring for 15 minutes, another 160 mL (0.08 mol) of BPA solution was added. Phosgene was introduced again at 0.5 g/min. for 18 minutes. The red color disappeared during the last two minutes of addition.

The reaction mixture was stirred 40 minutes, treated with 5 mL of methanol and 1 mL of acetic acid. The organic layer was diluted with 250 mL of DCM and extracted with water but the two liquid phases separated very slowly. Some fine white particles appeared at the interface. After six washings with water to remove the chloride, the organic layer was treated with isopropanol, whereby 52 g (80% yield) of polymer was formed. The polymer was dissolved in 800 mL of DCM, forming a light color solution which was stirred with 5 g of activated carbon overnight. The mixture was filtered and reprecipitated in isopropanol. The polymer thus obtained was found to have a reduced specific viscosity of 0.50 dL/g and a Tg of 191° C. A molded disc showed the following properties: Yellowness Index 18.6, transmission 75.8%, haze 18.8%.

EXAMPLE 4

In this experiment the phenolphthalein terephthalate prepolymer also contained 20% bisphenol-A terephthalate.

The procedure used was similar to that described in Examples 1 and 3 except that different amounts of various reagents were mixed in a different order. An aqueous solution containing 12.7 g (0.04 mol) of PTL, 4 g (0.1 mol) of NaOH, 0.68 g (0.002 mol) of TBAHS, 2.3 g (0.01 mol) of BPA and 200 mL of water was stirred vigorously with 500 mL of DCM under a nitrogen atmosphere. To this was added 20.3 g (0.1 mol) of TPC dissolved in 500 mL of DCM. The purplish red color of the mixture faded away upon addition of TPC and the polymer solution formed was slightly hazy. After stirring 15 minutes, 300 mL of an aqueous solution containing 34.2 g (0.15 mol) of BPA and 12 g (0.3 mol) of NaOH was added whereby a pink, viscous stable emulsion was formed. Fifteen minutes later phosgene was introduced at 0.5 g/min. for 20 min., whereupon the mixture became creamy color and fluidic again. After stirring for 30 minutes, methanol was added to consume the residual phosgene. The polymer solution separated readily on standing. It was washed six times with water and then precipitated in isopropanol. The polymer obtained was redissolved in DCM, treated with activated charcoal, filtered, reprecipitated, and dried.

The reduced specific viscosity was found to be 0.80 dL/g and the Tg was 200° C. A disc molded at 310° C. had the following properties: Yellowness Index 32.6; transmission 74.6%, haze 12.6%.

COMPARATIVE EXAMPLE 5

The apparatus consisted of a 5 L 3-necked flask fitted with a Trubore stirrer, a gas-inlet tube, a Dewar condenser and an additional dropping funnel (for aqueous BPA diphenolate). The gas-inlet tube was connected to a 1-lb net phosgene cylinder through a Balston Microfibre filter tube and a Matheson 190 601 rotameter. The Dewar condenser was filled with a cooling mixture at about 0° C. using water containing a few small pieces of Dry Ice. It was connected in series first to an empty suck-back trap followed by three neutralization traps containing 15% sodium hydroxide solutions. The reaction flask was immersed in a water bath at ambient temperature.

A solution containing 36.5 g (0.16 mol) BPA and 16 g (0.4 mol) NaOH dissolved in 250 mL of aqueous solution was placed in a dropping funnel. In a second funnel was placed 500 mL of DCM solution containing 20.3 g (0.1 mol) of TPC and 0.36 g (0.0024 mol) of p-tert-butylphenol. A mixture containing 12.7 g (0.04 mol) of PTL, 0.68 g (0.002 mol) of TBAHS, and 250 mL of water was charged to the reactor and stirred until a deep red solution was formed. An equal volume of DCM was added with vigorous stirring. Two hundred mL (0.04 mol) of the TPC solution and 4 g (0.04 mol) of PSG were added simultaneously over a period of 8 minutes. During this period the mixture changed from deep red to earth yellow. After 15 min. of stirring the BPA solution was added whereby the mixture became red again. After stirring for 15 minutes, the remaining 300 mL of TPC solution and 7 g of PSG were added simultaneously over a period of 14 minutes. The resulting milky red emulsion was stirred for 30 more minutes. Three mL of acetic acid was added to neutralize the residual basicity. The light brown emulsion separated slowly on standing.

The polymer solution was extracted five times with water to remove the chloride by-product. It was added slowly to 8 L of vigorously stirred isopropanol whereby the polymer precipitated. The latter was separated by filtration and dried in a 100° C. oven, yielding 46.1 g (71%) of off-white powder with a reduced specific viscosity of 0.41 dL/g.

COMPARATIVE EXAMPLES 6 AND 7

The procedure of Comparative Example 5 was used except that the amount of chain regulator was reduced by one-half (0.0012 mol) in order to increase the molecular weight of the product. However, the polymer thus obtained was found to have a reduced specific viscosity of 0.37 dL/g. In the next experiment no chain regulator was used, but the reduced specific viscosity of the polymer obtained was 0.33 dL/g. Thus, even though this method produced polymers without any pink color, the molecular weight obtained was too low to be practical.

COMPARATIVE EXAMPLES 8 AND 9

Two experiments were carried out in which the poly(ester-carbonate) was built up in a stepwise manner from the phenolphthalein-phosgene prepolymer.

In the first experiment, the phenolphthalein was first treated with two equivalents of phosgene so that the prepolymer was capped with chloroformate. This prepolymer was then treated with two equivalents of bisphenol-A, followed by terephthaloyl chloride, two more equivalents of bisphenol-A, and finally the remaining phosgene required. An outline of the procedure is given below.

A mixture containing 12.7 g (0.04 mol) of PTL, 3.4 g (0.085 mol) of NaOH, and 475 mL of water was stirred in a 3 L flask until a deep red solution was formed. A solution containing 0.68 g (0.002 mol) of TBAHS dissolved in 25 mL of water was added, followed by 500 mL of DCM. While the emulsion was being stirred vigorously, 8 g (0.08 mol) of PSG was introduced over a period of 16 minutes.

Two hundred and fifty milliliters of an aqueous solution containing 36.5 g (0.16 mol) of BPA and 15 g (0.375 mol) of NaOH was placed in a dropping funnel. Half of this solution was added to the reaction mixture which was stirred for 10 minutes. A solution containing 20.3 g (0.1 mol) of TPC dissolved in 500 mL of DCM was added. Five minutes later the other half of the BPA solution was added, followed by introduction of 3 g of PSG into the flask. The mixture was stirred under nitrogen for 30 minutes and neutralized with 2 mL of acetic acid. The polymer solution was washed repeatedly with water until the chloride had been removed. It was stirred into 8 L of isopropanol whereby the polymer obtained was filtered and dried. There was obtained 41.3 g (64% yield) of white powder with a reduced specific viscosity of 0.28 dL/g.

In the second experiment, PTL was first capped with PSG as before. The prepolymer was treated with all the BPA, then all the TPC, and finally the remaining PSG required to bring the total amount of ingredients equal to that used in the previous experiment. Again, low molecular weight (reduced specific viscosity 0.32 dL/g) powdery polymer was obtained.

What is claimed:

1. A process for the production of a poly(ester-carbonate) containing aromatic dicarboxylate moieties, carbonate moieties, 2,2-bis(p-oxyphenyl)phthalide moieties derived from phenolphthalein and bisphenol-derived moieties of the formula

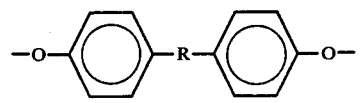

wherein R is a divalent organic moiety of 1–6 carbons, —S— or a single bond, which comprises:
   (a) reacting an aqueous solution consisting essentially of water, base and an alkali metal or an alkaline earth metal salt of phenolphthalein with an organic solution consisting essentially of a substantially water-insoluble solvent and an aromatic or cycloaliphatic diacyl halide, in the presence of a phase transfer catalyst, to form a phenolphthalein aromatic dicarboxylate polyester oligomer; and
   (b) polymerizing said polyester oligomer by reaction with phosgene and additional aromatic diacyl halide and by reaction with an aqueous solution of the alkalie metal or alkaline earth metal salt of the bisphenol-derived moiety to form a poly(ester-carbonate).

2. The process of claim 1 wherein R is

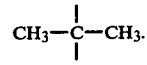

3. The process of claim 2 wherein said aromatic or cycloaliphatic dicarboxylate moieties are terephthalate or isophthalate moieties or mixtures thereof.

4. The process of claim 1 wherein said aromatic or cycloaliphatic dicarboxylate moieties are terephthalate or isophthalate moieties or mixtures thereof.

5. The process of claim 3 or 4 wherein said aromatic or cycloaliphatic dicarboxylate moieties are terephthalate moieties.

6. The process of claim 1 or 2 or 3 or 4 wherein said polymerizing step (b) comprises first reacting said oligomer with residual aromatic diacyl halide and phosgene and then reacting the product with the aqueous solution of the salt of the bisphenol-derived moiety.

7. The process of claim 6 wherein said reacting step (a) is conducted with a mole ratio of phenolphthalein salt:aromatic or cycloaliphatic diacyl halide between about 0.9:1 and about 0.5:1.

8. The process of claim 1 or 2 or 3 or 4 wherein said reacting step (a) is conducted with a mole ratio of phenolphthalein salt:aromatic or cycloaliphatic diacyl halide between about 0.9:1 and about 0.5:1.

9. The process of claim 1 or 2 or 3 or 4 wherein phosgene is present during said reacting step (a) in an amount between about 1 and about 20 percent, by moles of aromatic or cycloaliphatic diacyl halide.

10. The process of claim 9 wherein phosgene is present during said reacting step (a) in an amount between about 1 and aboout 10 percent, by moles of aromatic or cycloaliphatic diacyl halide.

11. The process of claim 1 or 2 or 3 or 4 wherein the salt of the bisphenol-derived moiety is present during said reacting step (a) in an amount about 1 and about 20 percent, by moles of phenolphthalein salt.

12. The process of claim 11 wherein the salt of the bisphenol-derived moieties present during said reacting step (a) in an amount about 1 and about 10 percent, by moles of phenolphthalein salt.

13. The process of claim 1 or 2 or 3 or 4 wherein said phase transfer catalyst is a tetraalkylammonium salt.

* * * * *